(12) United States Patent
Quirion

(10) Patent No.: US 7,323,841 B2
(45) Date of Patent: Jan. 29, 2008

(54) METHOD AND APPARATUS FOR DETECTING MULTIPLE OVERCURRENT THRESHOLDS USING A SINGLE COMPARATOR DEVICE

(75) Inventor: Jean P. Quirion, Upper Tantallon (CA)

(73) Assignee: International Rectifier Corporation, El Segundo, CA (US)

( * ) Notice: Subject to any disclaimer, the term of this patent is extended or adjusted under 35 U.S.C. 154(b) by 0 days.

(21) Appl. No.: 11/463,185

(22) Filed: Aug. 8, 2006

(65) Prior Publication Data

US 2007/0035271 A1  Feb. 15, 2007

Related U.S. Application Data

(60) Provisional application No. 60/706,956, filed on Aug. 10, 2005, provisional application No. 60/706,962, filed on Aug. 10, 2005.

(51) Int. Cl.
 H02K 17/32 (2006.01)
 H02K 23/68 (2006.01)
 H02K 27/30 (2006.01)
 H02P 7/00 (2006.01)

(52) U.S. Cl. .................................... 318/434; 318/432
(58) Field of Classification Search .................. None
 See application file for complete search history.

(56) References Cited

U.S. PATENT DOCUMENTS

| 5,723,960 | A  | * | 3/1998  | Harada ..................... 318/469 |
| 6,054,822 | A  | * | 4/2000  | Harada ..................... 318/434 |
| 6,170,241 | B1 | * | 1/2001  | Shibilski et al. ............. 56/11.9 |
| 6,956,343 | B2 | * | 10/2005 | Berroth et al. .............. 318/439 |

* cited by examiner

Primary Examiner—Lincoln Donovan
Assistant Examiner—Erick Glass
(74) Attorney, Agent, or Firm—Ostrolenk, Faber, Gerb & Soffen, LLP

(57) ABSTRACT

A method and an apparatus that permit the detection of multiple overcurrent thresholds, providing system protection particularly but not exclusively in brushless DC motor drive systems, but using only one comparator device instead of multiple comparator devices. The disclosed embodiments predict a higher overcurrent condition based on the time it takes to detect a lower overcurrent condition. Because of the predictive nature of the invention, the higher overcurrent conditions are detected much faster than when using conventional circuitry.

8 Claims, 4 Drawing Sheets

METHOD AND APPARATUS FOR DETECTING MULTIPLE OVERCURRENT THRESHOLDS USING A SINGLE COMPARATOR DEVICE

CROSS REFERENCE TO RELATED APPLICATIONS

This application is based upon and claims priority of U.S. Provisional Ser. No. 60/706,956 filed Aug. 10, 2005 (IR-3047 PROV), incorporated by reference.

It is related to U.S. Provisional Ser. No. 60/706,962 filed Aug. 10, 2005 (IR-3046 PROV), and its corresponding U.S. non-provisional application, IR-3046 (2-5455), filed on even date herewith, also incorporated by reference.

BACKGROUND OF THE INVENTION

1. Field of the Invention

The present invention relates to a method and apparatus for detecting multiple overcurrent thresholds, and more particularly for detecting multiple overcurrent thresholds using a single comparator device.

2. Related Art

In the design of brushless DC motor drive systems, there is often a requirement to sense the dc-link bus current. In brushless DC motor drive systems that are employed for safety-critical applications, such as but not restricted to electro-hydraulic power steering systems, the dc-link bus current is often used in detecting dangerous overcurrent conditions. Some safety-critical systems are required to detect multiple overcurrent thresholds. This enables the detection of multiple overcurrent conditions of various severities. For example, less dangerous overcurrent conditions are detected at lower thresholds, and very dangerous overcurrent conditions are detected at higher thresholds. The system can thereby react differently depending on the severity of an overcurrent condition. An example of circuitry used to measure the dc-link current and detect multiple overcurrent conditions is configured as shown in FIG. 1.

In FIG. 1, the dc-link current idc at the inverter stage 10 is measured using a current sensor 12. For example, this current sensor can be a dc-link shunt resistor, a Hall effect current sensor, etc. An amplifier and filter stage 14 appropriately conditions the measured dc-link current. The output of the amplifier and filter stage is a voltage that represents the dc-link current. This voltage is then presented to multiple comparators 16a, 16b . . . 16n. Each comparator compares the dc-link current to a specific threshold that represents a current level deemed more or less dangerous. In FIG. 1, there are "n" thresholds such that Thres1<Thres2< . . . < Thresn. Thres1 corresponds to the least dangerous overcurrent condition, whereas Thresn corresponds to the most dangerous overcurrent condition. If the dc-link current surpasses one or more of the comparator levels (i.e. Thres1, Thres2, . . . , Thresn), the outputs of the affected comparators switch, indicating to the microcontroller 20 that there is an overcurrent condition.

The inventor has noted two problems with this typical circuit.

A first problem is that using multiple comparators for detecting multiple overcurrent thresholds can be expensive in cost-sensitive applications, such as but not restricted to electro-hydraulic power steering systems. It would therefore be desirable to reduce the number of comparators needed to detect multiple overcurrent thresholds, to a single comparator.

A second problem is that the circuitry used to detect overcurrent conditions must be extremely fast, but its speed is usually reduced by the amplifier and filter stage, which exhibits a propagation delay. This propagation delay is unwanted because it could result in an overcurrent condition damaging the system before the system has time to detect the condition. This propagation delay is unwanted, but is a by-product of the filtering that is used to remove electrical noise. It would therefore be desirable to increase the speed of overcurrent detection.

SUMMARY OF THE INVENTION

Disclosed herein are embodiments of a method and an apparatus that permit the detection of multiple overcurrent thresholds, providing the system protection advantages described above, but using only one comparator device instead of multiple comparator devices.

The disclosed embodiments operate on the principle of predicting a higher overcurrent condition based on the time it takes to detect a lower overcurrent condition. Because of the predictive nature of the invention, the higher overcurrent conditions are detected much faster than when using the conventional circuitry depicted in FIG. 1.

At least two advantages are provided by this invention. Firstly, the system cost is significantly reduced because only one comparator device is required to detect multiple overcurrent thresholds. Secondly, the time taken to detect an overcurrent condition is reduced because of the predictive nature of the invention.

Other features and advantages of the present invention will become apparent from the following description of embodiments of the invention which refers to the accompanying drawings, in which like references indicate like elements and parts.

DETAILED DESCRIPTION OF EMBODIMENTS OF THE INVENTION

The Apparatus

Figure 1:
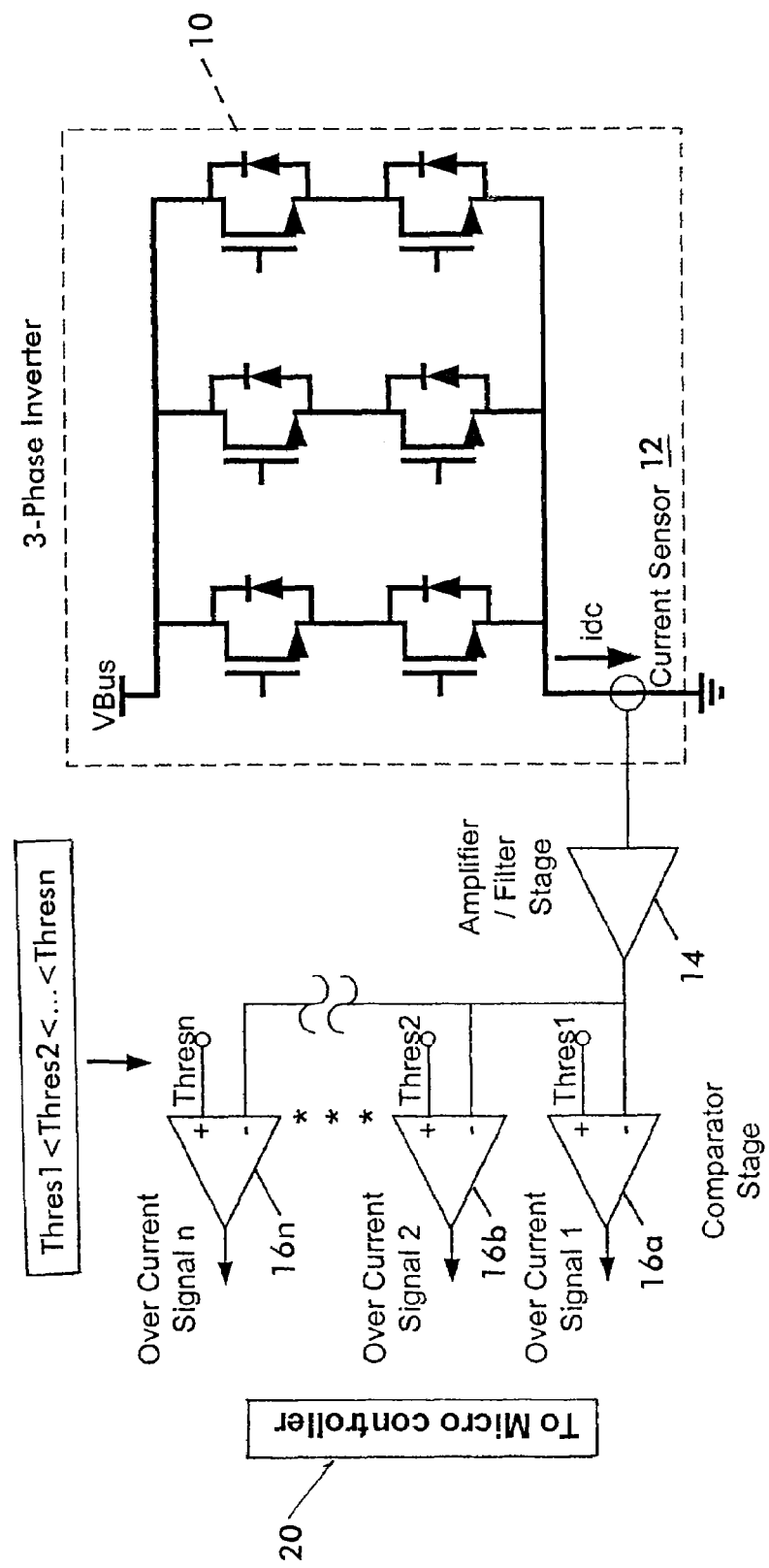
FIG. 1 is a schematic diagram showing a conventional overcurrent sensor.
Figure 2:
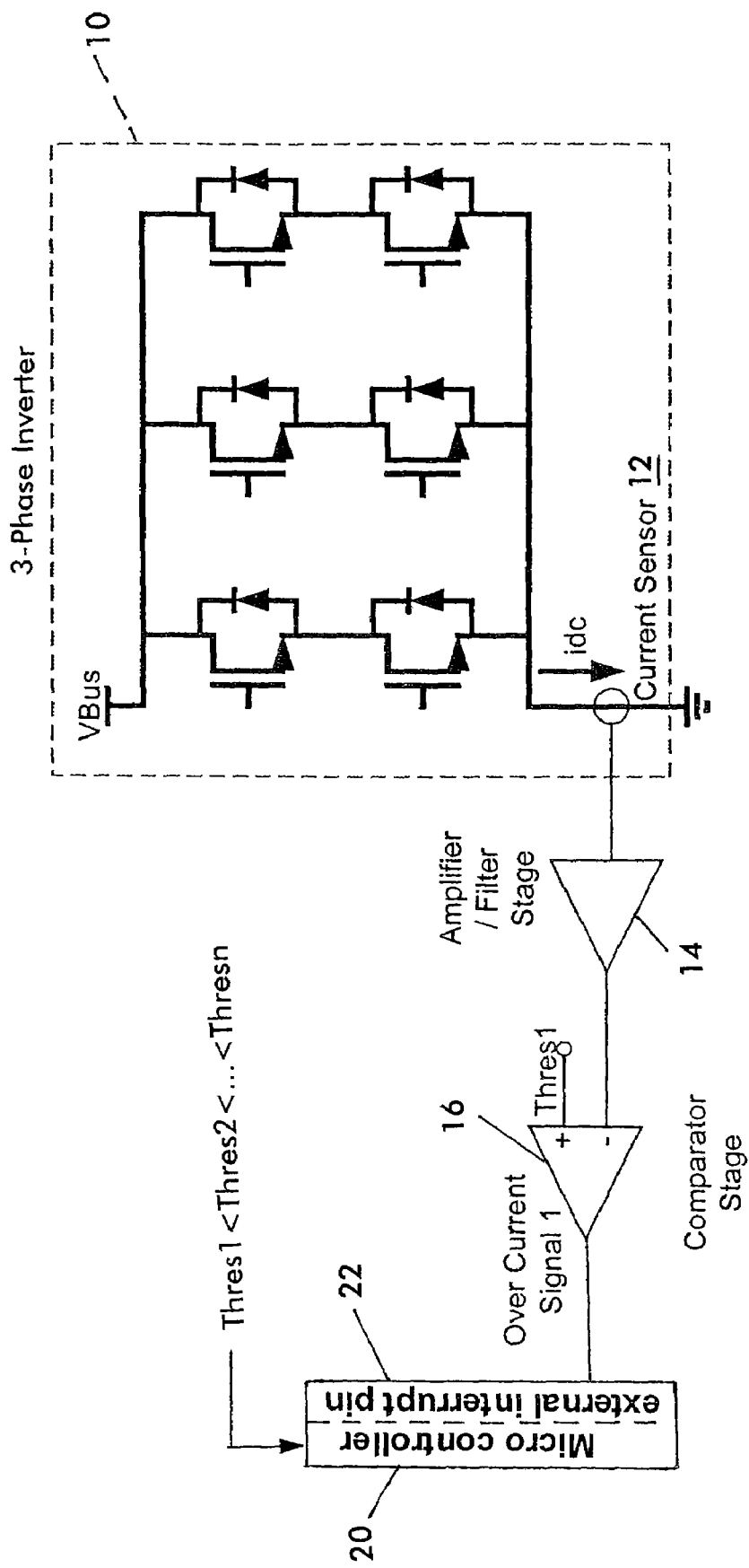
FIG. 2 is a schematic diagram showing an overcurrent sensor according to an embodiment of the invention.

An apparatus which may be used to detect multiple overcurrent thresholds using a single comparator device is shown in FIG. 2. Again, like the solution of FIG. 1, it is desired to detect "n" different overcurrent thresholds Thres1, Thres2, . . . , Thresn, where Thres1<Thres2< . . . < Thresn. Unlike the apparatus of FIG. 1, the apparatus of FIG. 2 may include only one comparator device 16 which is set to detect the lowest overcurrent threshold (i.e. Thres1). The output of this single comparator may be routed to an external interrupt pin 22 of the microcontroller 20. The specific use of a microcontroller is advantageous, but not essential. It may be replaced by another device or equipment that is operable for carrying out the invention described herein.

The Method

The microcontroller generates a pulse-width modulated (PWM) signal to turn the switches of the inverter 10 on or off in a specific sequence. Various techniques by which the inverter switches may be controlled to drive a brushless DC motor are well known to those in the art and need not be described in this document. In general, each time the PWM signal is high, two switches of the inverter are turned on, causing the motor current to flow into the dc-link (i.e. idc=motor current). Each time the PWM signal is low, the motor current recirculates into the inverter. The dc-link current is then zero (i.e. idc=0). The relationship between the motor current, dc-link current, and PWM signal is shown in FIG. 3.

Figure 3:
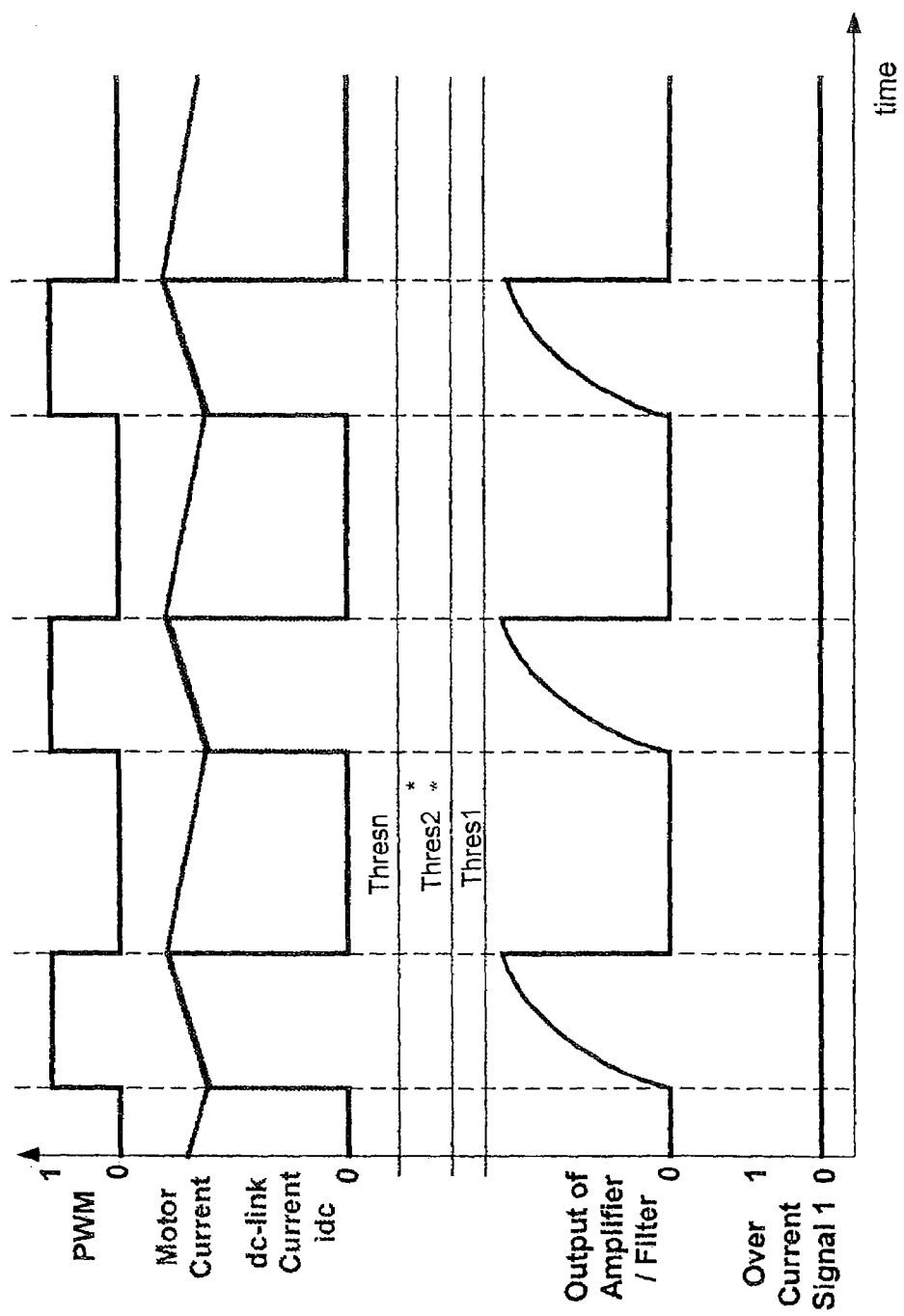
FIG. 3 is a graph showing signals of interest with a normal level of current

FIG. 3 also shows the output of the amplifier and filter stage 14, which represents the filtered and amplified dc-link current. Since this signal does not surpass any thresholds (i.e. Thres1, Thres2, ..., or Thresn), the output of the comparator 16 (i.e. Over Current Signal 1) remains low.

Figure 4:
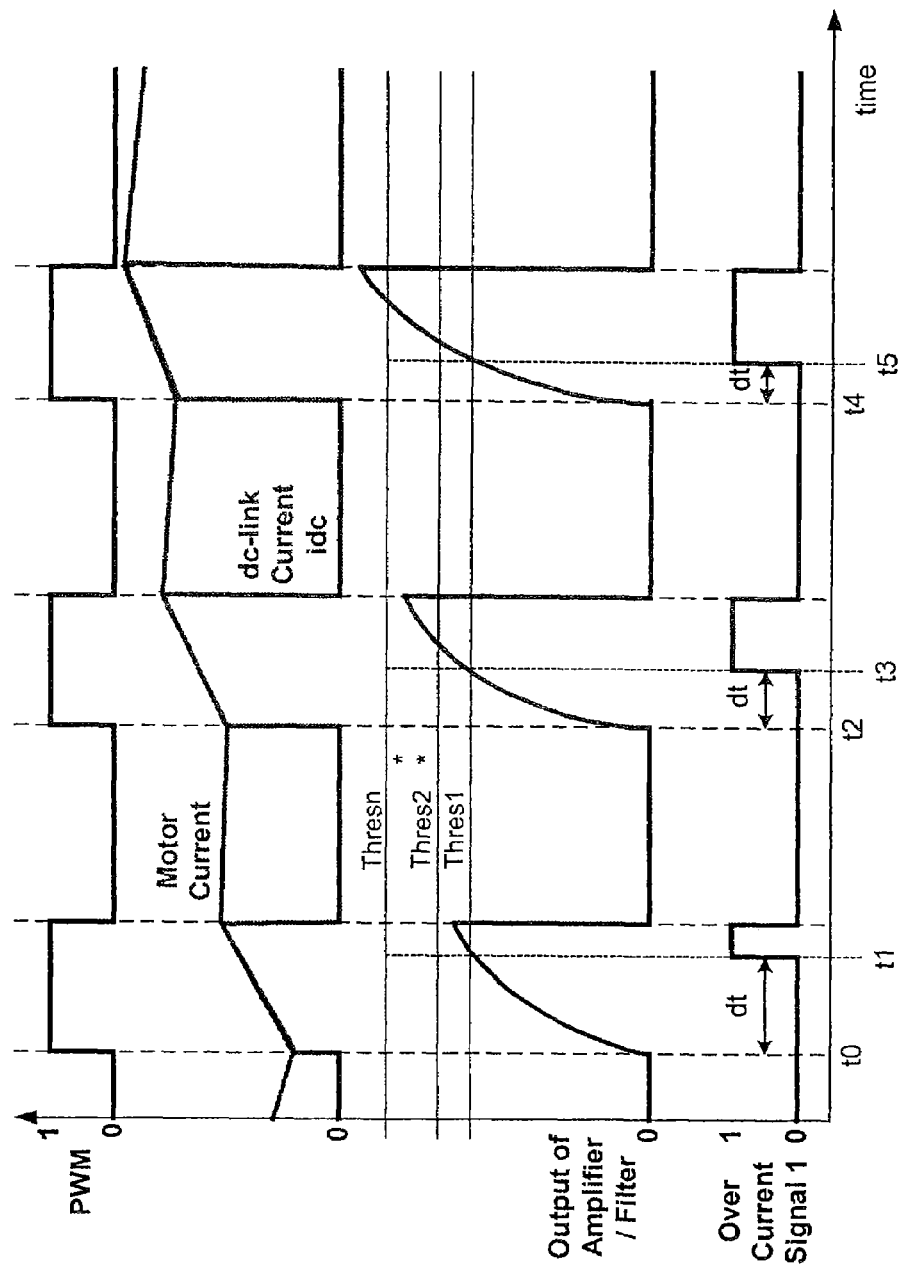
FIG. 4 is a graph showing signals of interest with increasing overcurrent levels.

As the motor current increases above one or more of the multiple overcurrent thresholds, the signals behave as shown in FIG. 4. FIG. 4 depicts three PWM cycles that begin at times t0, t2, and t4 respectively.

During the first PWM cycle, the motor current and therefore the dc-link current surpasses the lowest threshold Thres1. Therefore, the output of the amplifier and filter stage 14 causes the single comparator 16 to switch at time t1. Since the output of this single comparator is routed to an external interrupt pin, upon occurrence of this interrupt it is possible for the microcontroller to measure the time delay dt=t1−t0.

During the second PWM cycle, the dc-link current surpasses the first and second thresholds (i.e. Thres1 and Thres2). Here, unlike in older methods, there is no need for a second comparator that switches to indicate that the current has surpassed Thres2. In this embodiment of the invention, there is only a single comparator that switches to indicate that the current has surpassed Thres1. However, with the disclosed apparatus, we can again measure the time delay dt=t3−t2. We notice that for this second PWM cycle, dt is smaller than that measured during the first PWM cycle. This is due to the fact that the dc-link current level has increased since the first PWM cycle and therefore the output of the amplifier and filter stage increases faster. In fact, there is a relationship between the level of the dc-link current and the time delay dt. The larger the dc-link current, the smaller dt will be.

During the third PWM cycle, the dc-link current is very high and surpasses the highest threshold Thresn. For this PWM cycle, dt is very small.

Thus, it is possible to predict whether the current will surpass a particular threshold, based on how much time it takes for the comparator output to switch with respect to the start of the PWM cycle (i.e. based on dt).

Let us define the following values:

DT_Thres2: The value of dt when the peak dc-link current is exactly equal to Thres2.

DT_Thres3: The value of dt when the peak dc-link current is exactly equal to Thres3.

***

DT_Thresn: The value of dt when the peak dc-link current is exactly equal to Thresn.

Then, referring to FIG. 4, we see that

DT_Thresn<***<DT_Thres3<DT_Thres2<DT_Thres1. A method to predict whether the current will surpass a particular threshold can be defined as follows:

If we have received an overcurrent interrupt (i.e. a rising edge of the single comparator output has been detected), then:

If dt is larger than DT_Thres2, then the dc-link current level is above Thres1 only.

Else if dt is larger than DT_Thres3, then the dc-link current level is above Thres2 and Thres1 only.

***

Else if dt is smaller than DT_Thresn, then the dc-link current level is above all thresholds.

Else the dc-link current level is below all thresholds.

Note that this method effectively predicts whether the current will surpass the specific thresholds based on how fast the lowest threshold (i.e. Thres1) is reached. As such, using this method, it is known whether there is an overcurrent condition corresponding to one of the higher thresholds as soon as the lowest (i.e. Thres1) threshold is reached. Therefore, it can be said that this method is predictive in nature. That is, a higher overcurrent condition is known before the output of the amplifier and filter stage even reflects such condition. This method therefore takes much less time to detect the more dangerous overcurrent conditions than the typical method depicted in FIG. 1.

Although the present invention has been described in relation to particular embodiments thereof, many other variations and modifications and other uses will become apparent to those skilled in the art. Therefore, the present invention is not limited by the specific disclosure herein.

What is claimed is:

1. An apparatus for detecting multiple overcurrent conditions in a motor drive circuit, comprising:

a control circuit which controls the drive circuit to generate a drive current pulse;

a current sensor for generating a sensed current signal which is representative of said drive current pulse;

a comparator for receiving said sensed current signal and outputting an overcurrent signal to said control circuit when said sensed current signal exceeds a first threshold;

wherein said control circuit determines a time delay between a time when said drive current pulse is generated and a time when said sensed current signal representative of said drive current pulse exceeds said first threshold; and wherein said control circuit predicts, based on said time delay, whether said sensed current signal also exceeds at least one additional threshold which is higher than said first threshold.

2. The apparatus of claim 1, wherein said control circuit carries out a first control operation on said motor drive circuit when said sensed circuit signal exceeds said first threshold.

3. The apparatus of claim 2, wherein said control circuit carries out a second control operation on said motor drive circuit when said sensed current signal is predicted to exceed said at least one additional threshold.

4. The apparatus of claim 1, wherein said sensed current signal is predicted to exceed said at least one additional threshold in response to said time delay being shorter than a first predetermined time delay.

5. A method for detecting multiple overcurrent conditions in a motor drive circuit generating a drive current pulse, comprising the steps of:

sensing said drive current pulse and generating a sensed current signal based thereon;

comparing said sensed current signal against a first threshold;

determining a time delay between a time when said drive current pulse is generated and a time when said sensed current signal exceeds said first threshold; and predicting from said time delay whether said sensed current signal also exceeds at least one additional threshold which is higher than said first threshold.

6. The method of claim 5, further comprising carrying out a first control operation on said motor drive circuit when said sensed circuit signal exceeds said first threshold.

7. The method of claim 6, further comprising carrying out a second control operation on said motor drive circuit when said sensed current signal is predicted to exceed said at least one additional threshold.

8. The method of claim 5, wherein said sensed current signal is predicted to exceed said at least one additional threshold in response to said time delay being shorter than a first predetermined time delay.

* * * * *